INVENTOR.
MARTIN PRESTON

ATTORNEY

United States Patent Office 2,997,896
Patented Aug. 29, 1961

2,997,896
VARIABLE SPEED DRIVES
Martin Preston, 1880 Jackson St., Oakland, Calif.
Filed Oct. 8, 1958, Ser. No. 765,967
6 Claims. (Cl. 74—677)

This application is a continuation in part of my copending application filed on April 4, 1956, Serial No. 576,057, now abandoned for an invention of the same title.

This invention relates to reversible, variable speed drives, and more particularly to reversible, variable speed drives used in hoisting, towing and similar operations where a prime mover is required to overcome an unidirectional counteracting force such as the weight acting on the hoisting rope of a hoisting machine or the towing resistance of a ship or vehicle being moved by towing line of a winch.

In the present state of the art of stepless, variable speed, power transmitting devices used for such purposes and apart from the steam driven or electrically powered drives, drive units consisting of an internal combustion engine combined with a hydrokinetic torque converter have proved themselves fairly successful. However, owing to the irreversibility and limited speed range of the conventional internal combustion engine, the torque-speed characteristics of such devices are often found inadequate.

This is particularly so when a hoisting machine driven by such a device is called upon to lower a light load or an empty hook. But difficulties are also encountered at the lowering of comparatively heavy loads, because when the output shaft of the torque converter is forced to run in the reverse direction, high reverse speeds may impose an excessive torque load on the engine stalling the same and resulting in the complete loss of control over the lowering speed. To overcome this difficulty, such equipment is usually provided with a clutch for disconnecting the hoisting drum from the drive so that the load can be lowered under the influence of gravity and its descent is then controlled by a brake acting on the hoist drum. Such control is crude at its best and is often found inadequate for the inching up or down of the load.

The object of the invention is to create a hoist drive that permits temporary reversal of power applied to the hoisting drum for a quick but sensitively controlled lowering of the suspended load.

Another object of the invention is to provide a hoisting drive with such torque-speed characteristics that the holding stationary or inching up and down of a suspended load can be accomplished accurately and with ease.

Other novel features and advantages of the invention will be apparent from the following description of the accompanying drawings in which.

Figure 1:
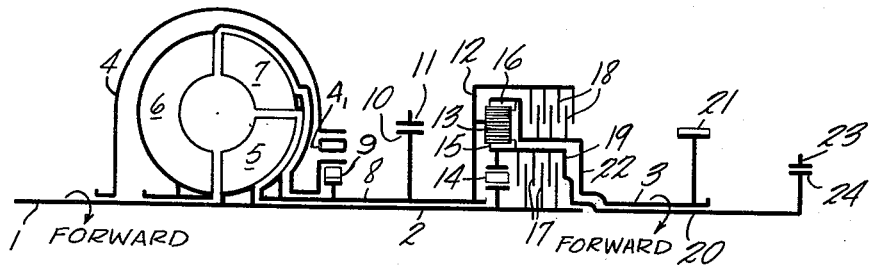
FIG. 1 is a schematic sectional view of the invented device.

The invention incorporates in its various alternative forms a hydrokinetic torque converter. In its simplest form said torque converter consists essentially of a centrifugal pump hydraulically coupled to a turbine with the fluid passing through these two devices in a closed circuit. The impeller shaft of said pump and the rotor shaft of said turbine constitute, respectively, the input and output shafts of the converter. The internal construction of such a converter is shown identically in FIGS. 1–3, where the impeller 5 is keyed to the input shaft 1, while the turbine rotor 7 is carried on the hollow output shaft 8 which may be provided with a one-way brake 9 that permits said output shaft to rotate in the forward or driving direction but prevents its being rotated in the reverse direction. The guide or reaction blading 6 of the turbine is shown as being connected to the stationary housing 4 by a one way brake $4_1$, which permits rotation in the forward direction only; however, it may also be mounted fixedly in the housing. Mounted also on the above mentioned output shaft 8 of the torque converter is brakedrum 10 on which selectively engageable brake shoe 11 acts.

As shown in FIG. 1, the torque converter is connected to a planetary gear unit in the following manner: The planetary carrier 12 which mounts a plurality of planetary pinions 13 is directly attached to the output shaft 8 of the torque converter, while sun gear 15 meshing with said planetary pinions 13 is mounted on the extension 2 of the converter input shaft 1 and is connected thereto by a selectively applicable disk clutch 17. Another connection between sun gear 15 and shaft 2 may be provided by overrunning clutch 14 that permits shaft 2 to overrun the sun gear in the forward direction but prevents the sun gear from overrunning the shaft in the forward direction. Meshing also with said planetary pinions 13 is internal gear 16 selectively engageable by disk clutch 18 with planetary carrier 12. Said internal gear 16 is mounted on a flanged extension 22 of tubular driven shaft 3 on which chain sprocket wheel or gear 21 is mounted for power take-off. Shaft 20 mounted inside said driven shaft 3 connects sun gear 15 by means of flanged extension 19 with brake drum 24 on which selectively applicable brake shoe 23 acts.

The device shown in FIG. 1 is interposed between an internal combustion engine, whose driving shaft is connected to the input shaft 1 of the converter, and a hoisting drum which is geared to the driven shaft 3 by means of power take-off gear 21.

In the normal operation of the device, brakes 11 and 23 are released and clutches 17 and 18 are disengaged. Then, as can be seen in FIG. 1, the forward rotation of sun gear 15 will tend to drive the power take-off gear 21 in the "reverse" direction, while, conversely, the "forward" rotation of the converter output shaft 8 will tend to drive the power take-off gear 21 in the "forward" direction. Consequently, if a sufficiently heavy load is suspended from the hoist drum, which load applies to the planetary carrier in the "reverse" direction a counter torque of a magnitude that exceeds the output torque of the torque converter, the output shaft 8 of the latter will be stopped altogether and the descending load will drive sun gear 15 in the "forward" direction. Hence, the load acting through overrunning clutch 14 will tend to overhaul the internal combustion engine and the torque converter coupled to it, so that the latter, having its output shaft stopped, will act as a brake, slowing down the descending load. If the engine is now speeded up, the output torque of the converter, being proportional to the square of the engine or input shaft speed, will increase to a point where it exceeds the counter-torque caused by the suspended load and so the converter output shaft 8 will start rotating in the "forward" direction, thereby slowing down the descent of the suspended load and ultimately stopping it. Further increase in the engine speed will start raising of the suspended load.

The hoisting speed can still be further increased by engaging friction clutch 18 which will lock together internal gear 16 with planetary carrier 12 and will cause the whole planetary gear unit to rotate as a solid body at the speed of the converter output shaft 8. Similar result could be had by locking together any other two elements of the three element planetary gear unit. In either case, overrunning clutch 14 will permit shaft 2 to overrun in the forward direction sun gear 15 which will rotate at a lower speed. The lag in rotation of the planetary unit behind that of the input shaft is caused by the slip between the pump impeller and the turbine rotor. This lag can be eliminated and direct drive between input shaft 1 and driven shaft 3 can be established by engaging clutch 17 that will lock sun gear 15 to input shaft 1 and will cause also pump impeller 5, turbine rotor 7 and reaction blading 6 to rotate together as an integral unit, thereby nullifying the action of the torque converter. To obtain this condition, however, it will be necessary to use the previously described optional arrangement wherein the reaction blading 6 is mounted on a one way brake instead of being immovably installed in the torque converter housing. To increase the hoisting speed still further clutch 18 is released and brake 23 is applied. This stops sun gear 15 and causes internal gear 16 and power takeoff gear 21 to rotate in the forward direction at a faster rate than converter output shaft and the therewith connected planetary carrier 12. The stopping of sun gear 15 will not hamper the rotation of the converter input shaft since overrunning clutch 14 permits the forward rotation of shaft 2.

Returning now to the lowering operation during which as stated before brakes 11 and 23 are released and clutches 17 and 18 are disengaged, and remembering that the forward rotation of sun gear 15 will tend to drive the hoist drum in the reverse or lowering direction while the forward rotation of the converter output shaft 8 will tend to drive the hoist drum in the forward or hoisting direction, it will appear that the resultant movement of the load suspended from the hoist drum will depend on the speed ratio of these two elements. Hence, in order to obtain the maximum lowering speed at a given engine speed, brake 11 is to be fully applied to bring converter output shaft 8 to standstill so that the full effect of the forward rotation of sun gear 15 is obtained on the hoist drum. However, if the load suspended from the hoist drum is very light, so that its overhauling effect does not reach sun gear 15 the latter may stall altogether and so will the hoisting drum. To prevent this, friction clutch 17 will then be engaged, locking sun gear 15 to input shaft extension 2.

It follows from the foregoing that the engagement of clutch 17 and the simultaneous application of brake 11 will force gear 21 to rotate in the reverse direction. On the other hand, engaging clutch 18 while brakes 11 and 23 are released, will apply the maximum obtainable driving torque to gear 21 in the forward direction. Finally, to obtain the maximum hoisting speed clutch 18 is released and brake 23 is applied.

Figure 2:
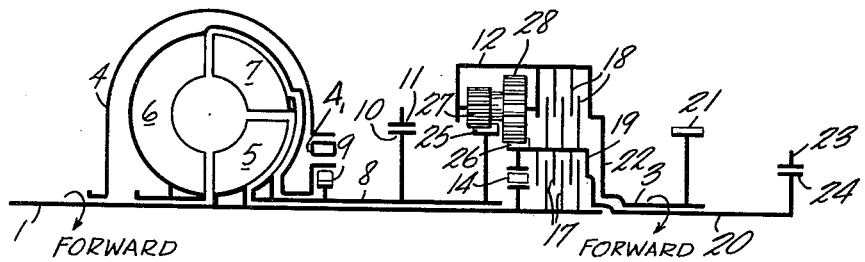
FIG. 2 is a similar view of the device with a modified arrangement of its gearing.
Figure 3:
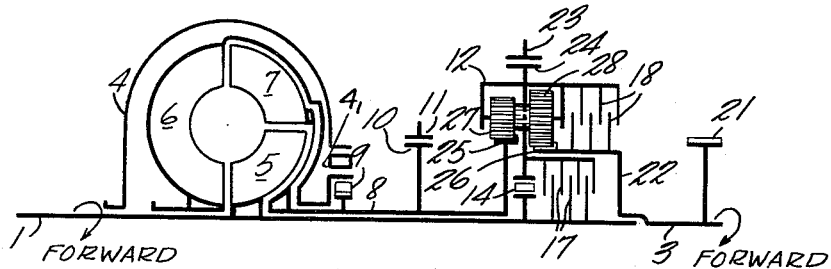
FIG. 3 is a similar view incorporating further modification of the gearing arrangement.

The type of planetary gearing shown in FIG. 1 is probably the most commonly used version of devices used for obtaining differential rotary motion. Another version, employing two sun gears and a planetary carrier with compound pinions is shown in FIGS. 2 and 3. There are many other such differential gearing arrangements in use performing the same function and the types shown here are intended only as illustrative examples.

In the embodiment of the invention shown in FIG. 2 converter output shaft 8 instead of being connected to the planetary carrier is driving directly sun gear 25 while a second smaller sun gear 26 is connected to converter input shaft extension 2 by means of overrunning clutch 14 and friction clutch 17. Driven shaft 3 carrying power take-off gear 21 instead of being driven by an internal gear is now connected to planetary carrier 12 which mounts a plurality of pinions pairs 27 and 28. These are fixed to each other and are in mesh with said sun gears 25 and 26, respectively. Friction clutch 18 serves now to lock together sun gear 26 with planetary carrier 12.

The functioning of this device is similar to that shown in FIG. 1. To drive gear 21 in the lowering direction, brake 11 is applied and clutch 17 is brought in engagement. To obtain the highest hoisting torque clutch 18 is engaged and to get the highest hoisting speed brake 23 is applied.

FIG. 3 shows the same elements as FIG. 2 but in a different arrangement. Planetary carrier 12 instead of being attached to the drive shaft is now connected by overrunning clutch 14 and friction clutch 17 to converter input shaft extension 2 while driven shaft 3 now carries sun gear 26. Furthermore, brake 23 acts now on planetary carrier 12 and friction clutch 18 now locks together planetary carrier 12 with driven shaft 3.

The functioning of this embodiment is similar to that shown in FIG. 2. Application of brake 11 combined with engagement of clutch 17 drives gear 21 in the lowering direction. Engaging clutch 18 produces the highest hoisting torque while application of brake 23 gives the highest hoisting speed.

Friction brakes 11 and 23 are represented as being of the shoe brake type. Friction clutches 17 and 18 are shown schematically as multi-disk clutches and could be of the fluid operated type in which the fluid is admitted through a rotary seal and an axial bore in the shafting. The one way brakes and the overrunning clutches are indicated in the drawings as being of the wedge roller type.

However, all these components are to be considered only as illustrative examples of the many diverse constructions well known in the art which could be used as equivalent means to perform the same function as the illustrative examples shown. It is therefore possibly to make changes in the arrangement of parts, or substitute equivalent elements in the invented device without departing from the spirit of the invention as described in the following claims.

I claim as my invention:

1. A reversible variable speed drive comprising a hydro-kinetic torque converter and a planetary gear set, said torque converter comprising a stationary housing, a drive shaft rotatably mounted therein and extending outwardly therefrom, an impeller adapted to rotate within said housing and being fixedly mounted on said drive shaft, a hollow output shaft mounted on said drive shaft and being partly contained within said housing, a turbine rotor fixedly mounted on said hollow output shaft at the inner end thereof and being adapted to rotate within said housing, reaction blading rotatably mounted on said hollow output shaft and being contained within said stationary housing, a one way brake interposed between said reaction blading and said stationary housing, said one way brake being adapted to prevent the reverse rotation of said reaction blading; said planetary gear set comprising a driven shaft and three rotatable elements interconnected by gears, the first such element being connected to said turbine rotor, and the second such element being connected to said driven shaft, a clutch means for connecting the third such element with said drive shaft; a selectively applicable friction brake acting on said first element of said planetary gear set, a selectively engageable friction clutch adapted to lock together two of the three rotatable elements of said planetary gear set; the arrangement of said interconnecting gears of the planetary gear set being such that the forward rotation of said first element of the planetary gear set and the simultaneous locking together two of the three rotatable elements of the planetary gear set by said friction clutch will cause said driven shaft to rotate in the forward direction, while the forward rotation of said third element of the planetary gear set and the simultaneous holding fast of the first element of the planetary gear set by said brake will cause said driven shaft to rotate in the reverse direction.

2. A reversible variable speed drive comprising a hydrokinetic torque converter and a planetary gear set, said torque converter comprising a stationary housing, a drive shaft rotatably mounted therein and extending outwardly therefrom, an impeller adapted to rotate within said stationary housing and being fixedly mounted on said drive shaft, a hollow output shaft mounted on said drive shaft and being partly contained within said housing, a turbine rotor fixedly mounted on said hollow output shaft at the inner end thereof and being adapted to rotate within said stationary housing, reaction blading rotatably mounted on said hollow output shaft and being contained within said stationary housing, a one way brake interposed between said reaction blading and said stationary housing, said one way brake being adapted to prevent the reverse rotation of said reaction blading; said planetary gear set comprising a driven shaft and three rotatable elements interconnected by gears, the first such element being connected to said turbine rotor, the second such element being connected to said driven shaft, clutch means for connecting the third such element with said drive shaft; a selectively applicable friction brake acting on said first element of said planetary gear set, a selectively applicable friction brake acting on said third element of said planetary gear set; the arrangement of said interconnecting gears in said planetary gear set being such that the forward rotation of said first element of the planetary gear set and the simultaneous holding fast of said third element of the planetary gear set by said brake will cause said driven shaft to rotate in the forward direction, while the forward rotation of said third element of the planetary gear set and the simultaneous holding fast of said first element of the planetary gear set by said brake will cause said driven shaft to rotate in the reverse direction.

3. A reversible variable speed drive for transmitting power from a driving shaft to a driven shaft, comprising a hydrokinetic torque converter whose input shaft is connected to said driving shaft, a planetary gear unit consisting of two coaxial sun gears of differing diameters and a planetary carrier mounting a plurality of planetary pinions fixed in pairs on common integral shafts journalled on said carrier one of each of the pairs of said pinions meshing with one of the said sun gears while the other pinion meshes with the other sun gear; the larger one of said sun gears being connected to the output shaft of said torque converter; said planetary carrier being connected to said driven shaft; clutch means for connecting the smaller one of said sun gears with said driving shaft.

4. A reversible variable speed drive for transmitting power from a driving shaft to a driven shaft, comprising a hydrokinetic torque converter whose input shaft is connected to said driving shaft, a planetary gear unit consisting of two coaxial sun gears of differing diameters and a planetary carrier mounting a plurality of planetary pinions fixed in pairs on common integral shafts journalled on said carrier, one of each of the pairs of said pinions meshing with one of the said sun gears while the other pinion meshes with the other sun gear; the larger one of said sun gears being connected to the output shaft of said torque converter; the smaller one of said sun gears being connected to said driven shaft; clutch means for connecting said planetary carrier to said driving shaft.

5. A reversible variable speed drive comprising a stationary housing, a drive shaft rotatably mounted therein and extending outwardly therefrom, an impeller adapted to rotate within said housing, and being fixedly mounted on said drive shaft, a hollow output shaft mounted on said drive shaft and being partly contained within said housing, a turbine rotor mounted on said hollow output shaft at the inner end thereof and being adapted to rotate within said housing, a planetary carrier mounted on the outer end of said output shaft in axial alignment therewith, a sun gear rotatably mounted on said drive shaft, an internal gear rotatably mounted with reference to said sun gear and being in transverse alignment and concentric therewith, a planetary pinion mounted on said planetary carrier and being simultaneously in mesh with said sun gear and said internal gear, reaction blading rotatably mounted on said hollow shaft and being contained within said stationary housing, a one way brake interposed between said reaction blading and said stationary housing, said one way brake being adapted to prevent the reverse rotation of said reaction blading, clutch means adapted to connect said sun gear and said drive shaft; a selectively applicable brake adapted to act on said hollow output shaft and a second selectively applicable brake acting on said sun gear.

6. A reversible variable speed drive comprising a hydrokinetic torque converter and a planetary gear set, said torque converter comprising a stationary housing, a drive shaft rotatably mounted therein and extending therefrom, an impeller adapted to rotate within said housing and being fixedly mounted on said drive shaft, a hollow output shaft mounted on said drive shaft and being partly contained within said housing, a turbin rotor fixedly mounted on said hollow output shaft at the inner end thereof and being adapted to rotate within said housing, reaction blading rotatably mounted on said hollow shaft and being contained within said stationary housing, a one way brake interposed between said reaction blading and said stationary housing, said one way brake being adapted to prevent the reverse rotation of said reaction blading; said planetary gear set comprising a planetary carrier fixedly mounted on the outer end of said hollow output shaft, a sun gear rotatably mounted on said drive shaft, a driven shaft, an internal gear fixedly mounted on said driven shaft and being in axial alignment with said sun gear, a planetary pinion mounted on said planetary carrier and being simultaneously in mesh with said sun gear and said internal gear, clutch means adapted to connect said sun gear to said drive shaft; a selectively applicable brake acting on said hollow output shaft, and a selectively engageable friction clutch for locking together two elements of said planetary gear set which elements normally are rotatable with respect to one another.

References Cited in the file of this patent

UNITED STATES PATENTS

| | | |
|---|---|---|
| 2,196,585 | Gette | April 9, 1940 |
| 2,290,319 | Dodge | July 21, 1942 |
| 2,350,810 | Pentz | June 6, 1944 |
| 2,368,684 | Simpson | Feb. 6, 1945 |
| 2,695,533 | Pollard | Nov. 30, 1954 |
| 2,890,600 | Smirl et al. | June 16, 1959 |